Figure 3:
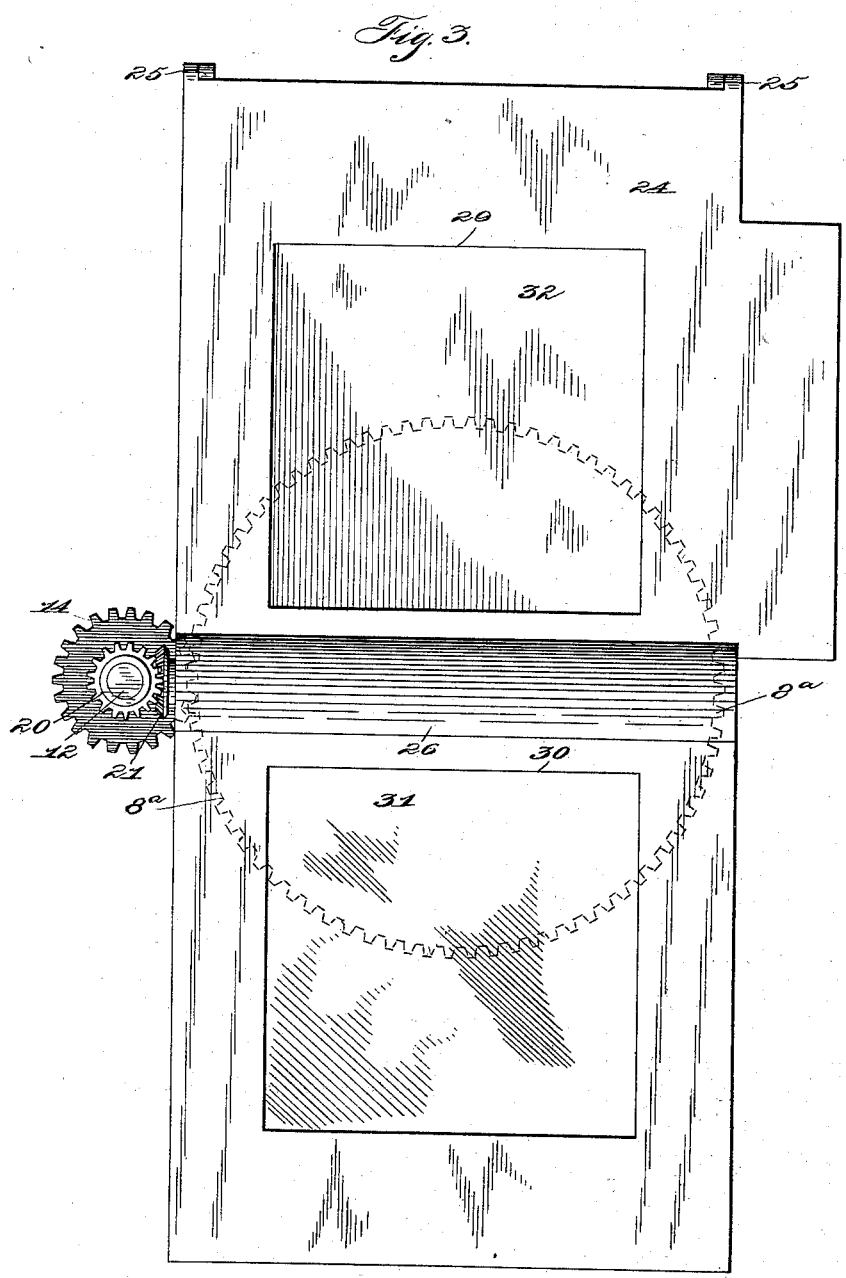

No. 609,465. Patented Aug. 23, 1898.
O. C. REEVES.
AUTOGRAPHIC REGISTER.
(Application filed Mar. 19, 1898.)
(No Model.) 2 Sheets—Sheet 1.
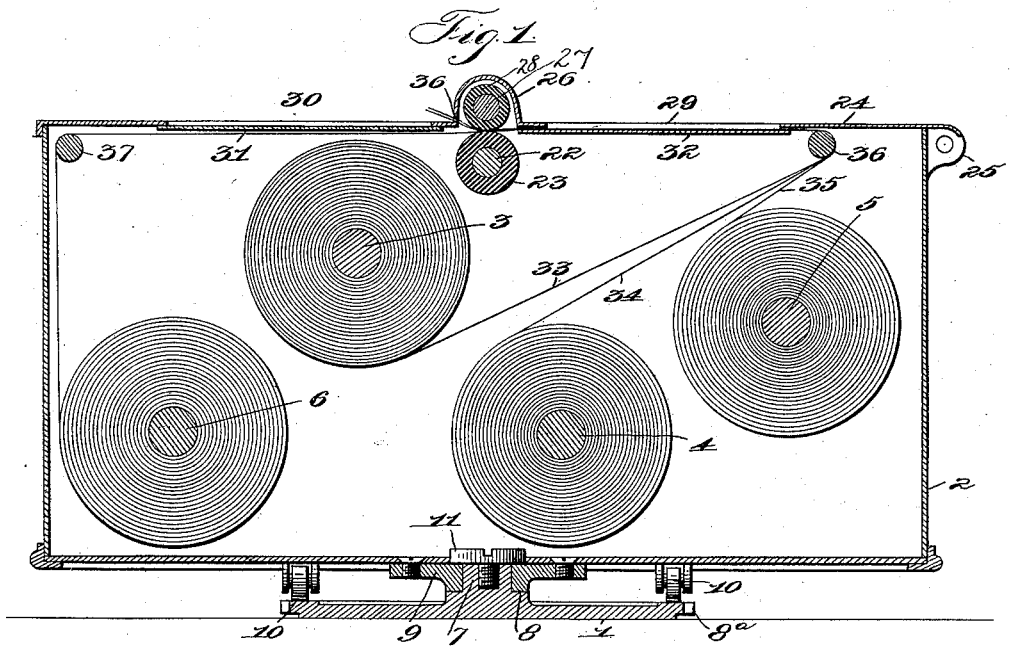
WITNESSES:
William F. Snuggy.
Wm. McCarthy.
INVENTOR.
Orwell C. Reeves
BY
Alvan Macauley
ATTORNEY.

No. 609,465.

O. C. REEVES.
AUTOGRAPHIC REGISTER.
(Application filed Mar. 19, 1898.)

Patented Aug. 23, 1898.

(No Model.)

2 Sheets—Sheet 2.

WITNESSES:
William H. Muzzy
Wm. McCarthy

INVENTOR.
Orrell O. Reeves.
BY
Alvan Macauley.
ATTORNEY.

UNITED STATES PATENT OFFICE.

ORWELL C. REEVES, OF DAYTON, OHIO, ASSIGNOR TO THE NATIONAL CASH REGISTER COMPANY, OF SAME PLACE.

AUTOGRAPHIC REGISTER.

SPECIFICATION forming part of Letters Patent No. 609,465, dated August 23, 1898.

Application filed March 19, 1898. Serial No. 674,482. (No model.)

*To all whom it may concern:*

Be it known that I, ORWELL C. REEVES, a citizen of the United States, residing at Dayton, in the county of Montgomery and State of Ohio, have invented certain new and useful Improvements in Autographic Registers, of which I declare the following to be a full, clear, and exact description.

This invention relates to improvements in cash-registers, and has more particular relation to registers of the autographic type.

The primary object of the invention is to provide improved means for automatically feeding the record and check strips of the machine forward.

The invention consists of certain novel constructions, combination, and arrangements of parts, all of which will be hereinafter more particularly set forth and claimed.

In the appended drawings, forming part of this specification, Figure 1 represents a central vertical longitudinal section through a machine embodying my invention. Fig. 2 represents an end elevation of the same, and Fig. 3 represents a top plan view of my said improvement.

In the aforesaid drawings, 1 represents the base of the machine; 2, the rotatable containing-casing; 3, 4, and 5, the respective supply-rollers, and 6 the record-roller.

The base 1 may be of any desired material and construction, with the exception that it is provided with a central journal-hub 7 and is formed about its periphery with rack-teeth $8^a$. The said hub 7 is formed with a supporting-shoulder 8, upon which rests the lower edge of a journal-block 9, secured to the under side of the casing 2 and journaled on the hub 7. The casing is movably supported and held against accidental tilting on the central journal by a plurality of antifriction rollers or wheels 10, secured to its under side and resting upon the top of the base 1, so as to travel over the latter near its periphery when the casing is rotated.

To prevent any accidental displacement of the journal-block 9 from the journal-hub 7, I provide a headed bolt 11, which is screwed into the said hub, with its head resting against the upper side of said block.

A vertical shaft 12 is journaled in suitable brackets 13 upon the side of the casing 2 and is provided at its lower end with a pinion 14, which meshes with the rack-teeth $8^a$, whereby the rotation of the casing will simultaneously rotate the shaft. This shaft is only capable of rotation in one direction, as all reverse movement is prevented by a clutch comprising a rigid-toothed member 15, secured to the casing and loosely surrounding the shaft 12, and a similarly-toothed member 16, also surrounding the shaft and provided with an inwardly-projecting pin 17, which enters and is slidable in a vertical groove 18, formed in the shaft. The member 16 is normally held down into mesh with the member 15 by a coil-spring 19, which surrounds the shaft 12 and bears with its opposite ends against one of the brackets 13 and the said member 16.

It will be observed from the foregoing description that the shaft 12 is free to revolve in one direction by the member 16 being elevated against the tension of the spring 19 by the inclined teeth of said members, but is prevented from rotating in an opposite direction by said teeth interlocking. The upper end of the shaft 12 is provided with a bevel-pinion 20, which meshes with a similar pinion 21, fast upon the protruding journal end of a feed-roller 22, journaled in the casing and suitably covered with a friction material 23. The cover 24 of said casing is hinged, as at 25, and is formed near its middle with a hood 26, in which is mounted a pressure-roller 27, covered with friction material 28, similar to the roller 22, and so located as to contact with said roller when the cover is closed. This cover 24 is further formed with two openings 29 and 30, respectively, the latter being covered by a glass panel 31 and the former by a writing-plate 32. The said plate is disconnected from the top upon two of its sides, so that the webs of paper 33, 34, and 35 from the respective rolls 3, 4, and 5 may be passed over the same, suitable carbon-sheets being interposed between the strips over said plate for securing the duplicate copies from one marking. In operation the strips 33, 34, and 35 first pass over a transverse bar 36, mounted in the casing, then over the plate 32, and, finally, between the feed and pressure rollers 22 and 26. After leaving said rollers the two upper strips 33 and 34 pass out of the casing through a slot 36, formed in the hood 26, while the strip 33 passes under the glass 30, over a transverse bar 37, and about the record-roller 6. This roller is rotated in any suitable manner, but preferably by suitable gearing connecting it with one of the moving parts of the machine, as shown in patent to J. Pfeifer, No. 496,894, dated May 9, 1893.

It will be seen from the above that after an entry has been made upon the strips lying above the plate 32 the same are moved forward by simply turning the casing 2 through one revolution. This action ejects the check-strips and causes the entry upon the strip 33 to pass below the glass 31, where it can be plainly seen, and at the same time draws fresh portions of the strips forward over the writing-plate.

Having thus described my invention, what I claim as new, and desire to secure by Letters Patent, is—

1. In an autographic cash-register, the combination with a base provided with a rack, of a casing movably mounted on said base, a writing-strip in said casing, a feeding-roller for moving said strip, an operating-shaft mounted on said casing and connected to both the rack and the feeding-roller so as to move the latter upon the movement of the casing and a clutch connecting the casing and the shaft for preventing movement of the latter except in one direction.

2. In an autographic cash-register, the combination with a base provided with a rack, of a casing movably mounted on said base, a writing-strip in said casing, a feeding-roller for moving said strip, an operating-shaft mounted on said casing and provided at its opposite ends with gears which engage respectively the base-rack and the feeding-roller so that the movement of the casing on the base will cause the movement of the feeding-roller.

3. In an autographic cash-register the combination with a base having a rack, of a casing pivoted thereon, antifriction-rollers mounted on said casing and engaging said base, a writing-strip in said casing, a feed-roller for said strip and gearing mounted on said casing and engaging said rack for moving the roller when the casing is turned.

4. In an autographic cash-register the combination with a base provided with a rack, of a casing movably mounted on said base, a writing-strip in said casing, a feed-roller for moving the same forward, an operating-shaft connected to the feed-roller, a gear mounted on said shaft and engaging the rack, a clutch member mounted on the casing and a spring-pressed companion member mounted on the shaft.

In testimony whereof I affix my signature in the presence of two witnesses.

ORWELL C. REEVES.

Witnesses:
WILLIAM H. MUZZY,
IRA BERKSTRESSER.